United States Patent
Rico Rubio et al.

(10) Patent No.: US 9,395,021 B2
(45) Date of Patent: Jul. 19, 2016

(54) SYSTEM AND METHOD FOR INTERCONNECTING UMBILICALS FOR CONVEYING ENERGY, FLUIDS AND/OR DATA IN A MARINE ENVIRONMENT

(75) Inventors: Antonio Rico Rubio, San Sebastian (ES); José Villate Martínez, San Sebastian (ES); Pablo Ruiz Minguela, San Sebastian (ES); Pierpaolo Ricci, San Sebastian (ES); Pedro Ibañez Ereño, San Sebastian (ES)

(73) Assignee: FUNDACION TECNALIA RESEARCH & INNOVATION, San Sebastian (Guipuzcoa) (ES)

( * ) Notice: Subject to any disclaimer, the term of this patent is extended or adjusted under 35 U.S.C. 154(b) by 111 days.

(21) Appl. No.: 14/364,942

(22) PCT Filed: Dec. 12, 2011

(86) PCT No.: PCT/ES2011/070853
§ 371 (c)(1),
(2), (4) Date: Aug. 8, 2014

(87) PCT Pub. No.: WO2013/087948
PCT Pub. Date: Jun. 20, 2013

(65) Prior Publication Data
US 2015/0003916 A1    Jan. 1, 2015

(51) Int. Cl.
| | | |
|---|---|---|
| F16L 1/12 | (2006.01) |
| H02G 1/10 | (2006.01) |
| H02G 9/02 | (2006.01) |
| H02G 15/14 | (2006.01) |
| H01R 13/523 | (2006.01) |
| F16L 1/26 | (2006.01) |
| F16L 1/16 | (2006.01) |
| H01R 13/00 | (2006.01) |

(52) U.S. Cl.
CPC . *F16L 1/123* (2013.01); *F16L 1/16* (2013.01); *F16L 1/26* (2013.01); *H01R 13/523* (2013.01); *H02G 1/10* (2013.01); *H02G 9/02* (2013.01); *H02G 15/14* (2013.01); *H01R 13/005* (2013.01)

(58) Field of Classification Search
CPC .... H01R 13/523; H01R 13/005; H02G 15/14; H02G 1/10; H02G 9/02; F16L 1/26
See application file for complete search history.

(56) References Cited

U.S. PATENT DOCUMENTS

| | | | | |
|---|---|---|---|---|
| 3,602,873 A | * | 8/1971 | Childers | H01R 13/523 439/201 |
| 4,378,848 A | * | 4/1983 | Milberger | E21B 33/0355 166/351 |
| 6,059,039 A | * | 5/2000 | Bednar | E21B 43/017 166/344 |

(Continued)

FOREIGN PATENT DOCUMENTS

| | | |
|---|---|---|
| EP | 2110910 A1 | 10/2009 |
| EP | 2237380 A1 | 10/2010 |

OTHER PUBLICATIONS

International Search Report for corresponding application PCT/ES2011/070853 filed Dec. 12, 2011; Mail date Sep. 5, 2012.

*Primary Examiner* — Benjamin Fiorello
(74) *Attorney, Agent, or Firm* — Cantor Colburn LLP

(57) ABSTRACT

The present invention relates to an interconnection system and method for interconnecting hoses (40) for transmitting power, fluids, data, or any combination thereof in a marine environment by means of a leak-tight device (10) in the inlets (230) of which terminal covers (30) for the passage of umbilicals and blind covers (80) for sealing said inlets (230) can be interchanged, such that each of the hoses can be connected and disconnected independently. The inlets are arranged such that the umbilicals are laid according to one and the same direction and orientation.

10 Claims, 7 Drawing Sheets

(56) References Cited

U.S. PATENT DOCUMENTS

| | | | |
|---|---|---|---|
| 7,108,069 B2 * | 9/2006 | Killie | E21B 33/0355 166/336 |
| 7,628,208 B2 * | 12/2009 | Lovie | B65D 88/78 166/250.15 |
| 2003/0021556 A1 | 1/2003 | Toth et al. | |
| 2004/0069492 A1 * | 4/2004 | Smith | E21B 33/0355 166/336 |
| 2008/0268721 A1 * | 10/2008 | Waltz | H01R 4/36 439/793 |
| 2010/0038090 A1 | 2/2010 | Barratt et al. | |

\* cited by examiner

SYSTEM AND METHOD FOR INTERCONNECTING UMBILICALS FOR CONVEYING ENERGY, FLUIDS AND/OR DATA IN A MARINE ENVIRONMENT

FIELD OF THE INVENTION

The present invention is applied in the field of power collecting systems in marine environments and in particular, in interconnection systems for interconnecting umbilicals for transmitting power, fluids and/or data in said environments between power generators or collectors and a power transfer system.

BACKGROUND OF THE INVENTION

The need of producing power beyond the traditional ways such as the ones based on fossil fuels or renewable energies has driven a great development of the so called "renewable energies" such as solar power, wind power, power obtained from waves or currents, etc.

However, in the case of power generation in facilities located in seas or lakes, the development of systems which allow transporting the power produced from the power collecting device generating it to a connection point of a distribution network on land is necessary to enable harnessing it. Additionally, it is essential that the power collecting device can be connected to and disconnected from said network for allowing its transfer to land for the purpose of performing repair work, maintenance, protection against storms, etc.

A common configuration is that in which there is an underwater electric cable which is connected at one end to the marine energy collector, while the other end is connected to a connection point of a power distribution network located on land.

However, some of these marine energy collectors do not convert marine energy directly into electricity, but act on a hydraulic or pneumatic system, generating a certain pressurised fluid flow which needs to be transported to another location, be it to the sea or the land, where that pressurised fluid flow is converted into electricity by means of the appropriate equipment.

It is also usually necessary to transmit data between the marine energy collector and another location, such that the system operation can be monitored, or remotely act on the equipment of these marine energy collectors.

For this purpose, there are flexible hoses containing therein conduits for channelling fluids, electric cables for transporting power, data transmitting systems such as optic fibres, or any combination of the preceding elements. These flexible hoses are called "umbilicals" (or umbilical cables) and allow physically connecting the marine energy collector with land in terms of power, fluids, and data level.

Another clearly distinctive aspect of this type of renewable marine energy is that, the collectors of this energy need a high level of maintenance and inspection due to the marine environment in which they work. Sometimes, they are only installed in their position for a few days or weeks, for the purpose of verifying their performance against certain circumstances. Other times, due to unforeseen malfunctions or storm threats, it is necessary to quickly remove them from their position to take them to the port. Installing or removing a marine energy collector on/from its location in the sea, due to the causes indicated above, always entails connecting or disconnecting the umbilical associated by means of a suitable connector which is inserted in the umbilical for such purpose.

Thus, connecting or disconnecting this umbilical and therefore the electric cables, optic fibre or fluid conduits must be able to be performed quickly and is designed for the possibility that this handling is done frequently.

Another feature to be considered is that several umbilicals originating from the marine energy collectors are commonly required to be independently interconnected in a single underwater hose or delivery umbilical which concentrates all the generated power and data for their transmission to land. The underwater layout of the delivery hoses or umbilicals is thus significantly simplified. Instead of installing as many umbilicals as there are power collectors in a certain location on land, it is only necessary to lay a single delivery hose or umbilical which concentrates all the power and data from different collectors.

Thus, a typical configuration of a marine energy collecting farm is that described in FIGS. 11 and 12 wherein an group of marine energy collectors is depicted which power and data are concentrated, by means of their umbilicals, in an interconnection device for transmitting these to land by means of a single delivery hose. That delivery hose is usually connected to the power network through a power sub-station on land. Connectors inserted in said umbilical are used for connecting and disconnecting the umbilical.

Elements capable of performing two differentiated functions in a collecting farm are thus necessary:

1.—Connecting and disconnecting the umbilicals for removing the energy collector devices, underwater connectors being used to that end.

2.—Interconnecting the power and data for concentrating and delivering them to land in a single hose or umbilical, an interconnection device being used to that end.

It should be pointed out that the connectors inserted in the umbilical are expensive elements since they are designed to enable connecting and disconnecting medium- and high-voltage electric cables in a marine environment as well as to enable using them frequently.

In general, the devices capable of interconnecting several umbilicals must be installed on the seabed at considerable depths, since it is there that lower stresses due to marine agents such as swell, currents or wind have to be endured.

Therefore, as the depth at which these interconnection devices are installed increases, the layout of the umbilicals that usually rest on the seabed which must be interconnected, also runs at greater depth. This complicates the underwater interconnection of these umbilicals since the underwater work with divers at depths greater than 50 meters is difficult, and practically impossible at depths greater than 100 meters.

From said depths onwards the use of underwater robots is necessary, increasing the cost and the connection or disconnection work operation time tremendously, therefore this option does not work for a case such as that described, with frequent operations in a quick and simple manner. To avoid the use of divers and underwater robots there are interconnection systems which allow its removal from the seabed to the surface to enable carrying out the necessary connection and disconnection operations. It is necessary to pay special attention to the removal operation of the interconnection device from the seabed in the case of two or more umbilicals interconnected to one another, since when attempting to raise the equipment to the surface both the umbilicals and the equipment can suffer stresses due to tightening of the umbilicals, such that any of the components can be seriously damaged. Similarly, the umbilicals can become entangled with one another or the equipment can land on the umbilicals when replacing the interconnection device on the seabed since these will reach the bottom first, with the consequent damage this entails.

It is also necessary that each umbilical originating from a marine energy collector can be disconnected from the interconnection device independently from the rest of the umbilicals connected to this interconnection device, shall it is necessary to remove a single marine energy collector from its location for maintenance.

Another important aspect in the field of marine energy collectors is that power protection equipment, flow regulating equipment, switching equipment, measuring apparatuses or any other device can be located in the interconnection element, such that in case of malfunction a single unit can be disconnected individually from the power circuit, hydraulic circuit or data transmission circuit or measurements of the quality and amount of electric current supplied or of the flow of the fluid supplied or of the signals sent can be taken or any other action can be carried out on a single umbilical without interfering the operation of the rest of the marine energy collectors connected to the interconnection device.

EP 2,237,380 shows an interconnection system for interconnecting underwater cables capable of being raised to the surface. However, said system does not allow the individual and independent removal of each electric cable. Furthermore, it does not solve the aforementioned problems of tightening during removal and the problems of depositing the interconnection device on top of the electric cables. Inserting electric apparatuses as those described in an individual and independent manner in each electric cable is also not possible with this system.

Several similar solutions which further use terminals such as those normally used on land considerably reducing the price of the device are also known in the state of the art. Nevertheless, the way in which the electric cables penetrate the device requires an "in situ" preparation of the electric terminals as well as of the mechanisms rendering leak-tightness to the conduits when they penetrate the connection chamber, therefore the connecting and disconnecting operation is slow and is not intended to be done frequently.

Therefore in the state of the art of marine energy generation systems, there is not an interconnection system and method based on interconnection devices which can be raised to the surface, which allow connecting and disconnecting umbilicals in a simple and independent manner and assuring the integrity of all the elements involved during the raising and subsequent placing of the same.

DESCRIPTION OF THE INVENTION

The present invention solves the aforementioned problems by means of a leak-tight interconnection system and method for interconnecting umbilicals (umbilical or umbilical cable is understood as a flexible hose which can contain electric cables, fluid channels and/or optic fibres intended for transmitting data or any combination of the above) between at least one power generator (for example, a wind turbine, a wave energy collecting system, a current energy collector, etc.) and a power transfer system (the term "power transfer system" should be interpreted broadly, and can cover any system for transmitting or distributing the power generated in one place, for example, in a generator located in the sea to, for example, a land power distribution system) according to the content of the claims.

The system comprises at least one transmission umbilical connectable to the power generator, a delivery umbilical connectable to the transfer system and one leak-tight device comprising a base adapted for resting on a seabed.

The leak-tight device comprises connection means for connecting the umbilicals inside the leak-tight device (for example, connecting several transmission umbilicals originating from different power generators to the delivery umbilical).

The device comprises raising elements to allow removing the device and raising it to the marine surface by an auxiliary boat intended for such purpose.

The device also comprises a plurality of inlets, each of which allows the independent passage of an umbilical. The inlets are located in an area of the leak-tight device other than the base of the leak-tight device (for example, on its walls or side perimeter) to prevent the entanglement and deterioration thereof and arranged (for example, distributed on its walls or side perimeter) such that all the umbilicals connected thereto are laid in one and the same direction and orientation.

The system comprises two different types of elements for the leak-tight sealing of the inlets, which can be freely and simply interchanged for connecting, disconnecting, and interchanging umbilicals:

Terminal covers adapted for connecting to one of the inlets and allowing the passage of an umbilical into the device through the mentioned inlet. Since said terminal covers are connected and disconnected in an auxiliary boat outside the water and result in a leak-tight sealing once connected, the electricity, fluids, and/or data connection elements are preferably conventional connection elements designed for traditional use on land, therefore not requiring a special treatment for being in a marine environment. For connecting an umbilical, the latter is prepared on land with the appropriate terminals.

Blind covers adapted for connecting to one of the inlets sealing the inlet in a leak-tight manner without any hose passing through them. Preferably the geometry, outer shape and sealing means of the blind covers are the same as those of the terminal covers, facilitating their interchange with said terminal covers The leak-tight device also comprises equipment which allows directly measuring, regulating or converting (or carrying out any action) the power, fluids and/or data inside of the leak-tight device.

All the umbilicals connected to the leak-tight device are laid (be this laying on the seabed, floating or at mid-depth) in one and the same direction and orientation with respect to said device to allow raising the device simply, the length or laying of said umbilicals preferably being equal to or greater than the depth of the seabed on which said leak-tight device is arranged. There can be auxiliary umbilical grouping and/or securing elements for aiding said laying configuration. The system of the invention further comprises an auxiliary anchoring element located on the seabed in the same direction and opposite orientation with respect to the leak-tight device as the laying direction and orientation of the umbilicals. Preferably, the terminal covers comprise leak-tight seals for sealing the umbilical, umbilical securing jaw to prevent the movement thereof with respect to the port cover and movement restrictors to prevent umbilical damage due to bending.

The leak-tight device can comprise a leak-tight sealing hatch for operator access, which allows the access to the device once it is on the deck of the auxiliary boat for operation or maintenance work.

The system can comprise a surface buoy marking the position of the device and is attached thereto by means of a suitable rope, chain or cable.

A second aspect of the invention depicts a leak-tight interconnection method for interconnecting umbilicals for transmitting power, fluids and/or data (or any combination of the above) between at least one power generator arranged in a marine environment (for example, a wind turbine, a wave energy collecting system, a current energy collector, etc.) and a power transfer system (the term "power transfer system" should be interpreted broadly, and can cover any system for transmitting or distributing the power generated in one place, for example, in a generator located in the sea to, for example, a land power distribution system), comprising the following steps:

Raising with an auxiliary boat a leak-tight device such as that described in the system of the present invention, with multiple inlets for the entrance of individual umbilicals. Preferably, the method has a previous step of anchoring the boat to an auxiliary anchoring element located at a certain distance from the leak-tight device, opposite to the laying of the umbilicals. More preferably, said anchoring is performed without tension during the step of raising, such that the boat performs a natural movement towards the device in the laying direction and the device is lifted in a curvilinear trajectory.

Independently interchanging any number of terminal covers and/or blind covers in the inlets of the device with other terminal covers and/or blind covers. Given that both the terminal covers and the blind covers perform leak-tight sealings and that each terminal cover allows the independent passage of an umbilical, connecting, disconnecting, or replacing the umbilicals simply and independently accessing each of them is achieved.

Placing the device on the seabed. Preferably during this step the anchoring with the auxiliary anchoring element is tight, such that the boat moves towards said anchoring element and the device performs a descending curvilinear trajectory assuring that the umbilicals are laid in the desired direction and orientation without having folds or being trapped under the device. The described method and system therefore allow connecting, disconnecting and interchanging umbilicals simply and independently accessing each of them. They also allow the use of traditional connection elements, not designed with special requirements for use in the marine environment and the installation of equipment which monitor or manage the data, fluids, or power of the umbilicals within the device itself. This and other advantages of the invention will be apparent in light of the detailed description thereof.

BRIEF DESCRIPTION OF THE DRAWINGS

For the purpose of aiding to better understand the features of the invention according to a preferred practical embodiment thereof and to complement the description, the following illustrative and non-limiting drawings are attached as an integral part thereof.

DETAILED DESCRIPTION OF THE INVENTION

In this text, the term "comprises" and its derivations (such as "comprising", etc.) must not be understood in an excluding manner, i.e., these terms must not be interpreted as excluding the possibility that what is described and defined may include more elements, steps, etc.

Likewise, the term "umbilical" refers herein to any hose used in a marine environment for transmitting power, data, fluids, or any combination thereof. They are also known as "umbilical cables". Specifically, part of the detailed description of the preferred embodiments describes the umbilicals which exclusively transport electric power, but the system is also valid for umbilicals which only transport data, power, fluids, and any combination of data, power and fluids. It should be noted that the umbilicals described can be hoses connecting any of the following elements: energy collectors, interconnection systems, marine bases, connection systems for connection with land power network, or any other element of the marine energy generating system.

Figure 1:
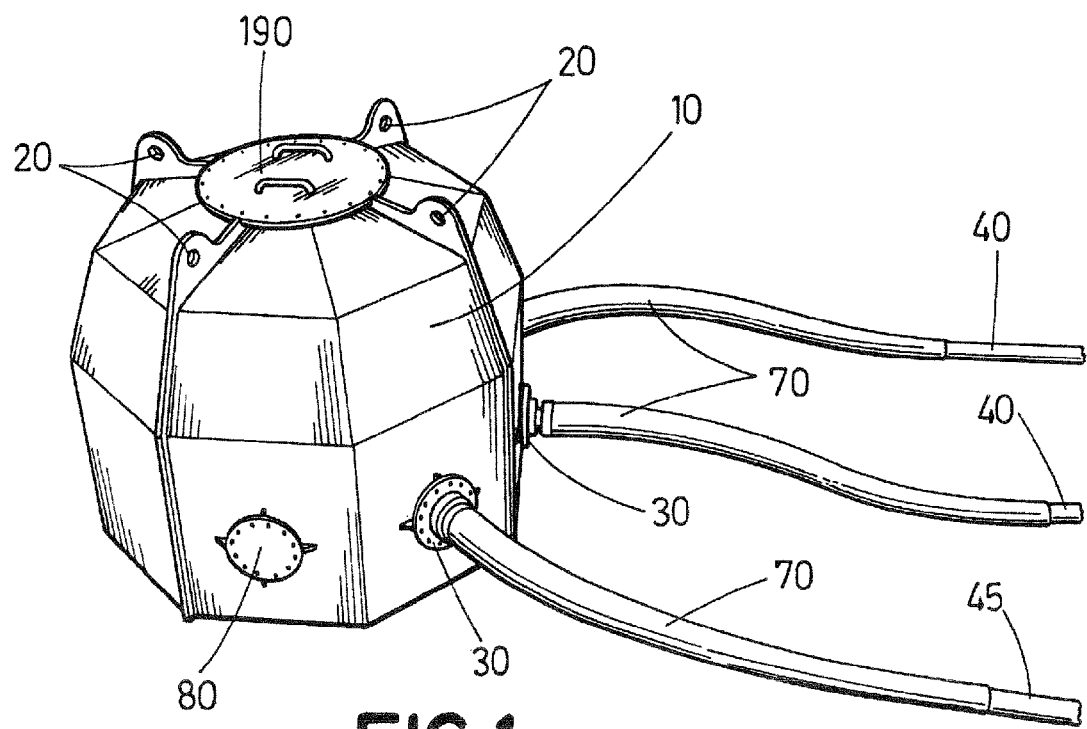
FIG. 1 shows a first perspective view of the leak-tight interconnection device according to a possible embodiment of the invention.

It should also be noted that, although the auxiliary boat is referred to for explaining the removal system, said boat does not form part of the object of the system of the invention as has been claimed, and therefore its inclusion in the description of said system has an explicative and non-limiting nature. FIG. 1 shows an external view of a preferred embodiment of a leak-tight interconnection device 10 with negative buoyancy which rests on the seabed. The leak-tight device 10 having raising elements 20 for raising by means of a crane, and a leak-tight sealing hatch 190 for the passage of operators into the same once the leak-tight device 10 is raised to the surface. The position of this leak-tight interconnection device 10 is marked by means of a buoy 150 on the surface, attached to the device 10 by means of a rope, chain or cable 160.

Figure 2:
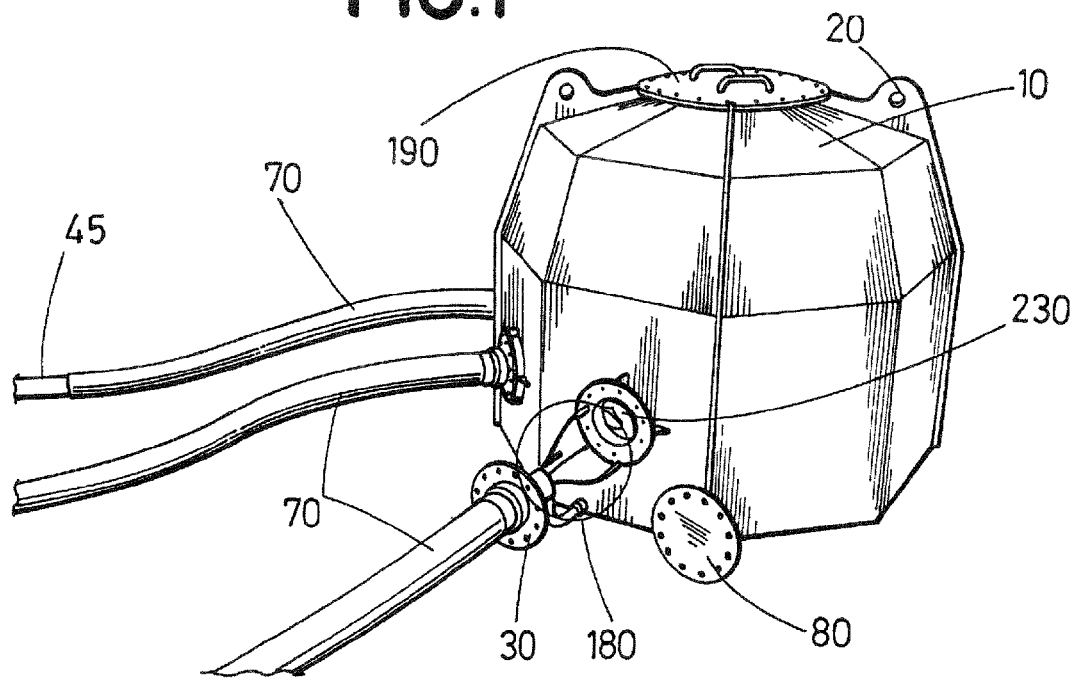
FIG. 2 shows a perspective view of the outer elements representative of the interconnection device according to said embodiment of the invention.
Figure 3:
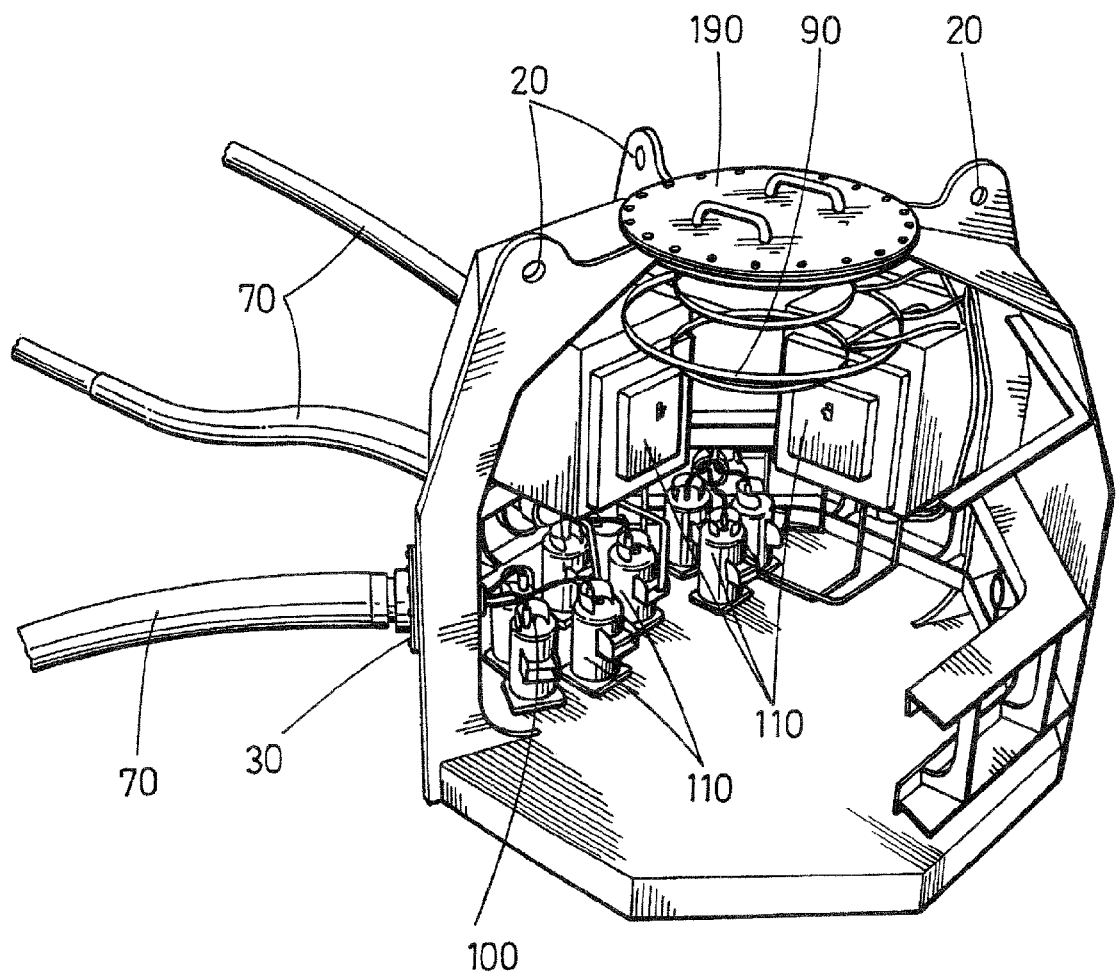
FIG. 3 shows a perspective view of the inside of the leak-tight interconnection device for a particular case particular in which the umbilical only contains electric cables.
Figure 4:
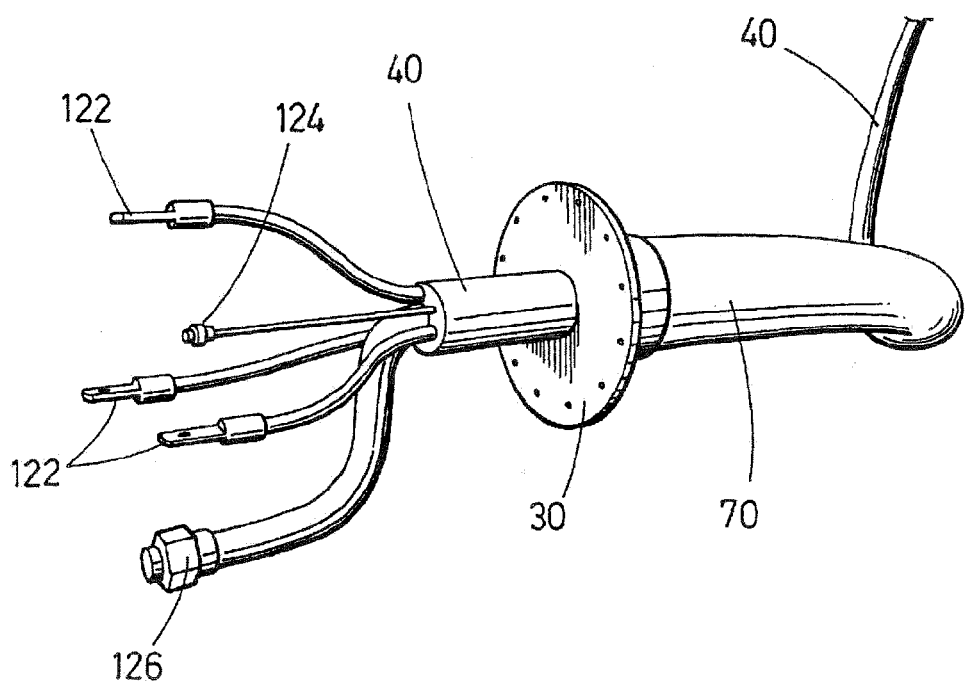
FIG. 4 shows a perspective view of the termination of an umbilical.

FIG. 2 shows a second external view in which one of the umbilicals 40 has been disconnected from the leak-tight device 10 to allow viewing the opening or inlet 230 of umbilicals designed for such purpose. The leak-tight device 10 comprises:

Terminal covers 30, each prepared for the passage of the umbilical 40 to the inside through the inlet 230. As observed in FIG. 3, these terminal covers 30 are provided with leak-tight seals 50 for sealing the umbilical 40, securing jaw 60 of the umbilical 40 to prevent its movement with respect to the terminal cover 30 and movement restrictors 70 to prevent umbilical 40 damage due to bending the umbilical 40 during the placing of the leak-tight device 10 on the seabed. Likewise, as seen in FIG. 4, the hose can comprise three types of terminals 120:

Electrical connection terminals 122.
Optic fibre connections 124.
Hydraulic or pneumatic connections 126.

Given that interconnecting said terminals 120 is performed inside the device 10 and that the hoses goes into the device 10 through a leak-tight seal, said terminals can be conventional terminals for land use, without any special design for use in the marine environment.

Blind covers 80 preventing the entrance of water into the leak tight device 10 through the inlets 230. Both the terminal covers 30 and the blind covers 80 have the same geometry in their outer area and have the same screws or holes provided for housing the screws and leak-tight seal for fixing to the ports 230 of the leak-tight device 10, such that the opening or inlet 230, left by any one of them can be occupied by any other port cover, regardless of its type.

Figure 5:
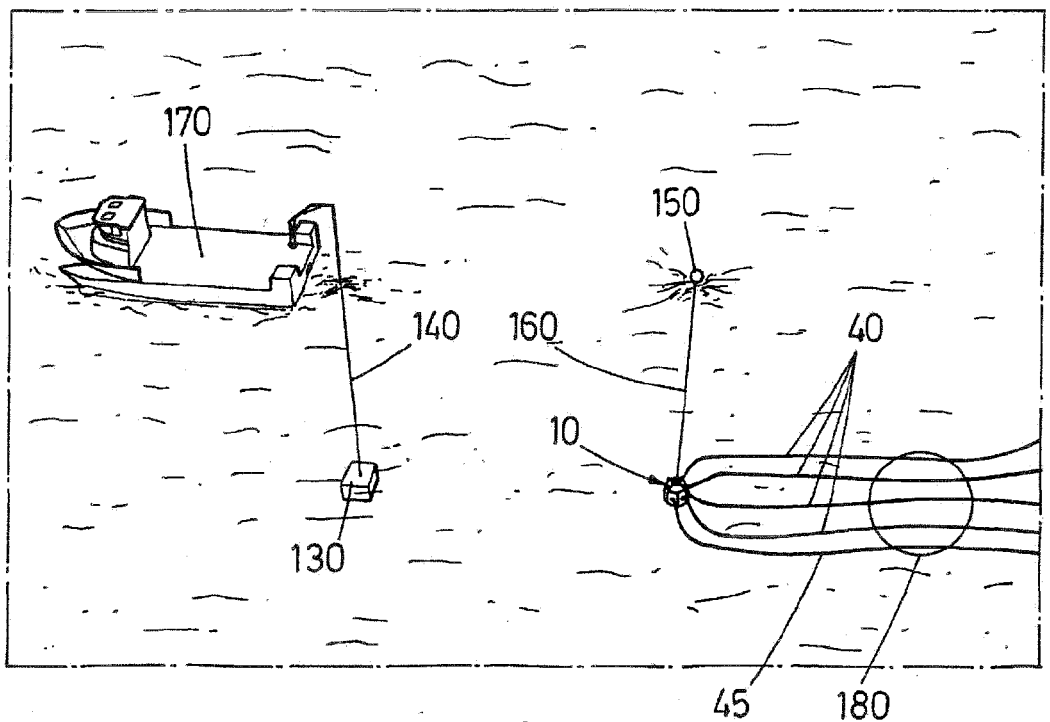
FIG. 5 shows a perspective view of the preparation of the umbilical for connecting to the interconnection device according to an embodiment of the invention.

FIG. 5 shows an inner view of the device 10 in which connection means configured for interconnecting the umbilicals 40, and therefore the power generating devices and the system for transmitting power to the power network through said umbilicals 40 are seen. These connection means have an electrical bus bar 90, provided with means for connecting the electric terminals 100 as well as the measuring equipment 110, circuit breakers and connection switches and/or any other electrical equipment intended for regulating, converting, protecting, interrupting, measuring or any other purpose, in this case the connection means for the electric terminals being found in the electrical equipments.

Figure 6:
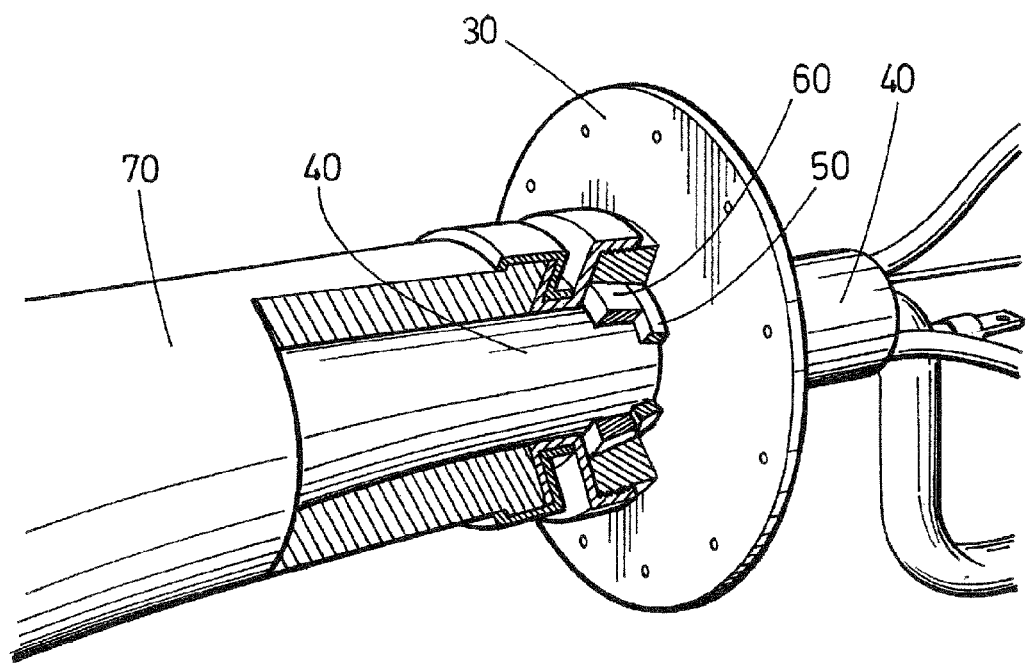
FIG. 6 shows a perspective view of the inside of the interconnection device, for the case in which the umbilicals only contain electric cables.

FIG. 6 shows the connection between the electric terminals 100 and the measuring equipment 110 in greater detail, an inner securing jaw 220 securing the umbilical 40 to the structure of the leak tight device 10 also being seen, being able to make use of the metal elements of the leak-tight device 10 through, where appropriate, the framework of the umbilicals (40) for connection to ground.

The connection means also have a fluid collector for interconnecting several fluid conduits, provided with means for connecting the hydraulic or pneumatic terminals, as well as the measuring equipment, cut-off valves and/or any other hydraulic or pneumatic equipment intended for regulating, protecting, interrupting, measuring or any other purpose, in this case the connection means for the hydraulic or pneumatic terminals being located in the hydraulics or pneumatic equipment.

The connection means also have an optic fibre concentrator for interconnecting several optical fibres of different devices, provided with means for connecting the optic fibre terminals as well as the measuring equipment, alignment equipment, switching equipment and/or any other equipment for transmitting data by optic fibre intended for regulating, protecting, interrupting, measuring or any other purpose, in this case the connection means for the optic fibre terminals being located in the optic fibre equipment.

If the system connects at least one energy collector with a land power network, the system has an umbilical 45 for delivering the power generated by said electrical or hydraulic or pneumatic collector to land. For the correct working of the interconnecting operation all the umbilicals 40 and 45 connected to the interconnection device 10 must follow a laying configuration 180 with the same direction in their laying, be this on the seabed, floating or at mid-depth, for a distance greater than the depth at which the leak-tight device 10 is located. For aiding said laying configuration 180 there can be auxiliary umbilical grouping and securing elements.

Finally, the system comprises an auxiliary element for the operation of recovering, connecting and replacing the device to its original position, which auxiliary element having an anchoring point 130 for anchoring to the seabed and operation rope, cable or chain 140, and optionally any other anchoring device or devices for anchoring to the seabed or mechanical pulling device or devices to aid the operation. In a preferred embodiment, the anchoring point 130 for anchoring to the seabed consists of a concrete mooring post, this anchoring point being able to be any other possible system according to the state of the art.

In order to connect an umbilical 40 to the leak-tight device 10 described, a method comprising the following steps in one of its preferred embodiments is shown:

(i) Preparing the umbilical 40 to be connected. This preparation can be done on land or on the deck of an auxiliary boat 170. To that end the umbilical 40 is provided with suitable connection terminals 120, be it electrical 122, optic fibre 124 or hydraulic or pneumatic 126 connection terminals, where appropriate. The umbilical 40 is passed through the hole designed for such purpose in the terminal cover 30, where there is a leak-tight seal 50 assuring the leak-tightness between the umbilical and the terminal cover 30. There is a clamp 60 assuring the securing of the umbilical 40 to the terminal cover 30, as well as the force transmission. The inclusion of a movement restrictor 70 to prevent umbilical damage is also contemplated. There are multiple solutions for achieving the leak-tightness, securing by means of clamps and restricting the umbilical movements in the state of the art.

Figure 7:
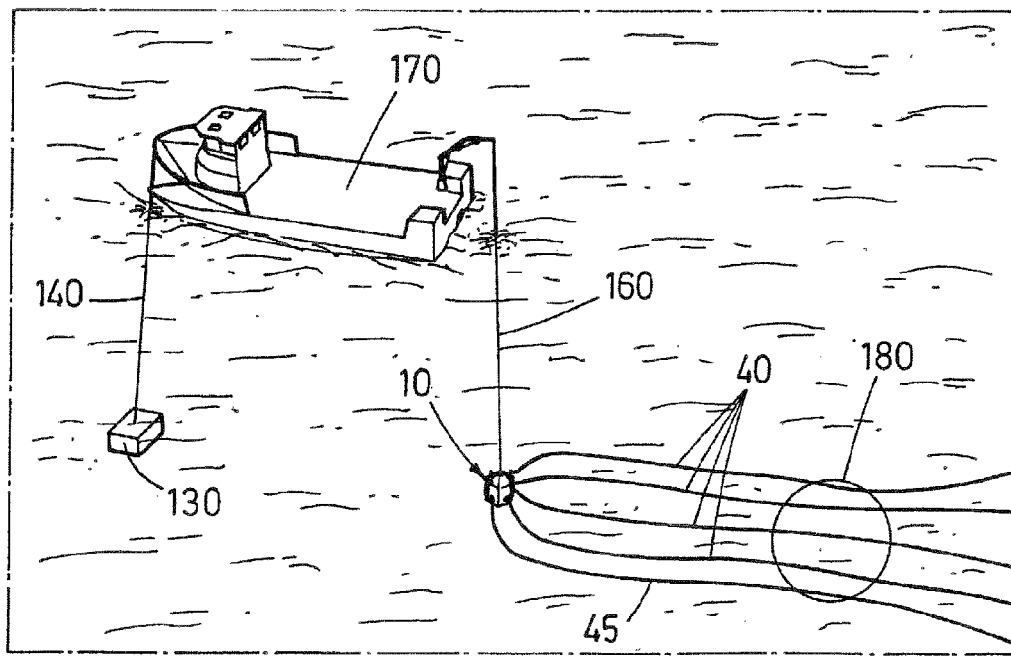
FIG. 7 shows a diagram of the step of anchoring to the auxiliary anchoring element according to a preferred embodiment of the method of the invention.

(ii) Locating the anchoring point 130 for anchoring to the seabed and, if necessary, other auxiliary elements according to FIG. 7. This anchoring point 130 is placed on the seabed, on the side opposite that which the umbilicals 40 run, according to the laying configuration 180 depicted. Once said anchoring point 130 and, where appropriate, other auxiliary elements are positioned, these can remain in their positions for future operations, thus without the need of being removed when the operation object of the invention has ended, having to in this case mark the position by means of a signalling buoy. To facilitate the operation the predominant wind, current or swell directions of the area can be monitored, the laying configuration 180 of umbilicals in the initial installation and therefore, the position of the anchoring point 130 for anchoring to the seabed being adequately oriented.

The rope, cable or chain 140 of the anchoring point 130 is secured to said anchoring point 130 at one end, the other end being secured to the auxiliary boat 170 such that the rope, cable or chain 140 is stress free.

Figure 8:
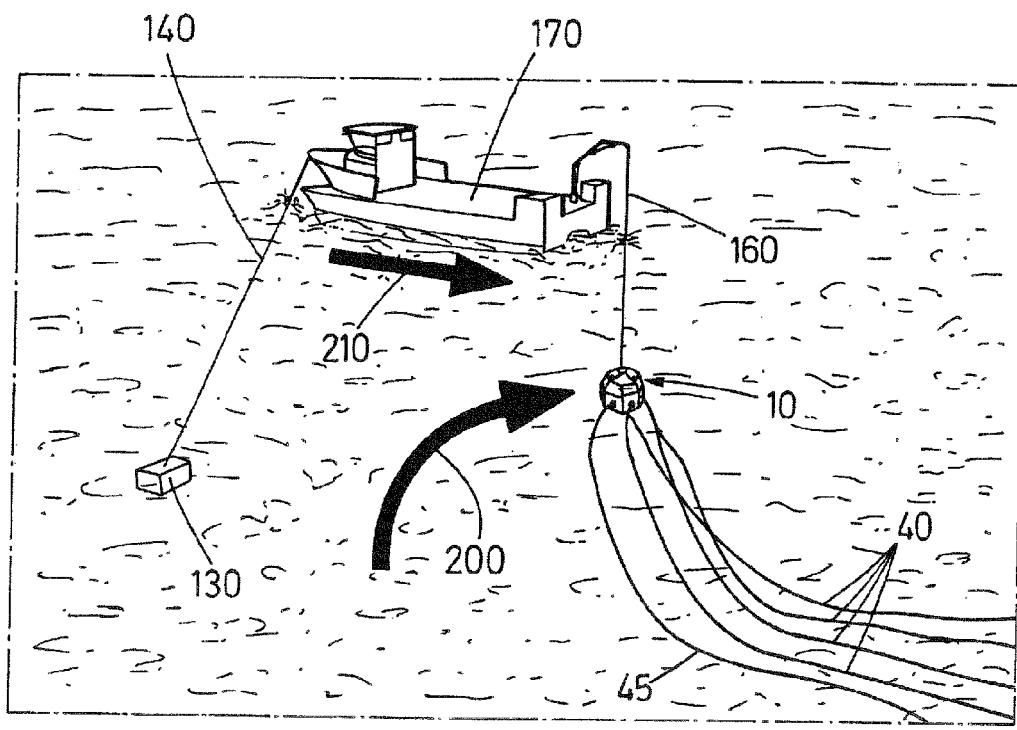
FIG. 8 shows a diagram of the step of the start of raising the device according to a preferred embodiment of the method of the invention.
Figure 9:
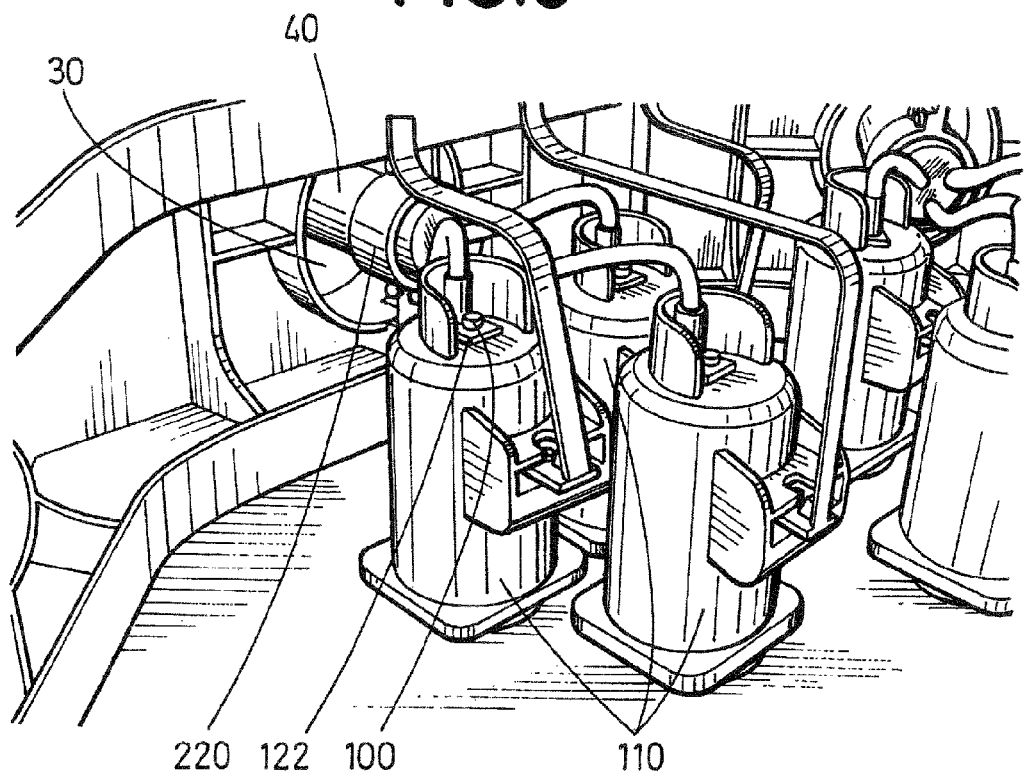
FIG. 9 shows a diagram of the step of raising the device according to a preferred embodiment of the method of the invention.

(iii) Removing the leak-tight device 10 from the seabed to the surface. To that end the auxiliary boat 170 recovers the rope, cable or chain 160 of the buoy with the suitable raising means, starting to pull said rope, cable or chain 160 and maintaining the rope, cable or chain of the anchoring point 140 for anchoring to the seabed stress free. The start of this process is observed in FIG. 8.

As the auxiliary boat 170 recovers the rope, cable or chain 160 the boat performs a first movement 210 towards the leak-tight device 10, since the rope, cable or chain 140 secured to the anchoring point 130 remains stress free.

Likewise, the leak-tight device 10 ascends to the surface due to the pulling by means of the rope, cable or chain 160, describing an ascending curvilinear trajectory 200. This operation allows the interconnection device 10 to ascend to the surface without the umbilicals 40 suffering any tensile force.

(iv) Connecting an umbilical. Once the leak-tight device 10 is located on the deck of the auxiliary boat 170, the blind cover 80 is removed, according to FIG. 2, allowing to place in its place the terminal cover 30 which is connected to the umbilical 40 prepared according to step (i). The terminal cover 30 is fixed to the leak-tight device 10 by means of screws or any other system, any element rendering leak-tightness between the terminal cover 30 and the inlet 230 being able to be provided.

In this arrangement, the umbilical 40 together with its connection terminals 120 remain inside the leak tight device 10 through the inlet 230, according to FIG. 5, being fixed by means of the port cover 30 and all the accessories thereof.

Another inner clamping jaw 220 securing the umbilical 40 to the structure of the leak-tight device 10 can optionally be used, being able to make use of the metal elements of the leak-tight device 10 through, where appropriate, the framework of the umbilicals (40) for connection to ground.

Once the umbilical 40 is introduced into the leak-tight device 10 and the latter is fixed by means of the terminal cover 30, the electric cables, fluid conduits or optic fibre can be connected, be it directly to the electrical bus bar 90, to the hydraulic or pneumatic collector, or to the optic fibre concentrator, or to the equipment 110 by means of the suitable connection means 100 and the connection terminals 120 associated with the umbilical.

To facilitate connecting the umbilical 40 to the connection means 100 the inside of the interconnection device 10 can be accessed through the hatch 190.

It should be noted that although the replacement of a blind cover 80 with a terminal cover 30 having an umbilical 40 has been described, the reverse change, as well as the replacement of an umbilical 40 with another umbilical 40, are also possible. Likewise, since each inlet port 230 can be operated directly and independently, multiple port cover replacements can be performed in one and the same removal of the device.

Figure 10:
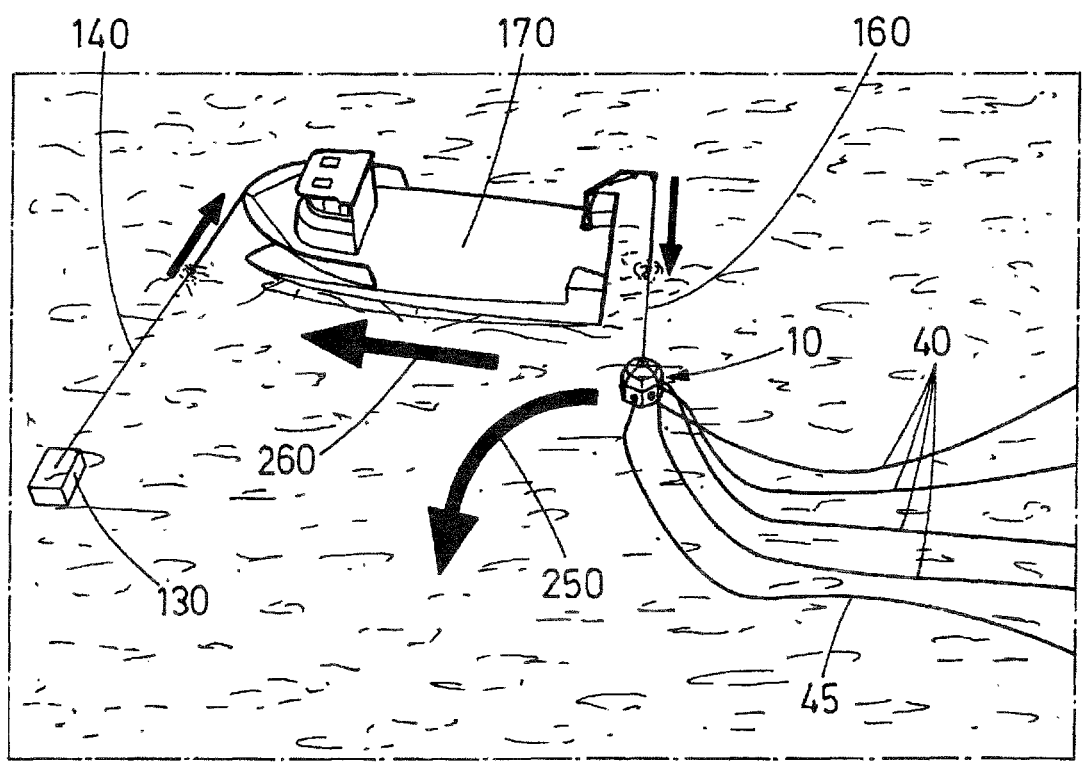
FIG. 10 shows a diagram of the step of placing the device on the seabed according to a preferred embodiment of the method of the invention.

(v) Placing the leak-tight device 10 in the original position. Once the connection of the umbilical has been performed according to step 4, and the leak-tightness of the leak-tight device 10 is assured, to return it to its original position on the seabed without it landing on the umbilicals 40 or 45, said device is lowered with the aid of the loading means of the auxiliary boat 170 which releases the rope, cable or chain 160 of the buoy at the same time as the rope, cable or chain 140 attached to the anchoring point 130 is recovered, maintaining it under stress. Following this configuration, and as observed in FIG. 10, the leak-tight device 10 descends to its position on the seabed following a descending curvilinear trajectory 250, while at the same time the auxiliary boat 170 performs a second movement 260 in the orientation opposite the device.

Thus, the interconnection device 10 returns to its original position on the seabed, the umbilicals 40 and 45 being laid correctly and without the possibility of them being trapped under the leak-tight device 10.

Figure 11:
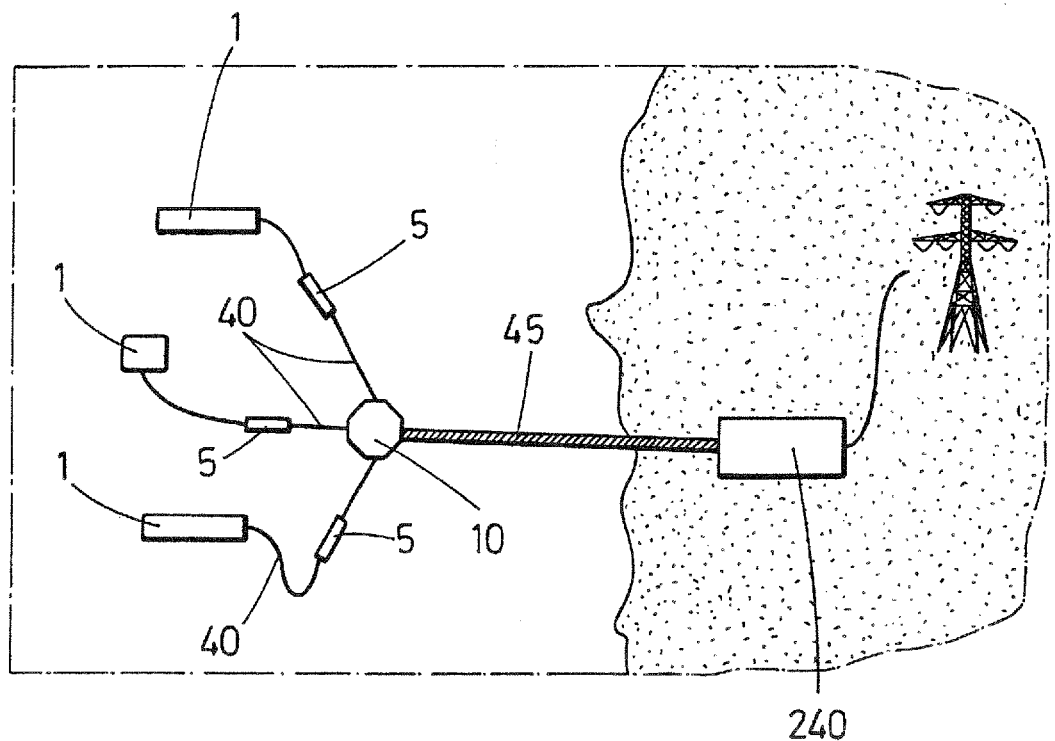
FIG. 11 shows a plan view of a typical marine energy collecting farm configuration.
Figure 12:
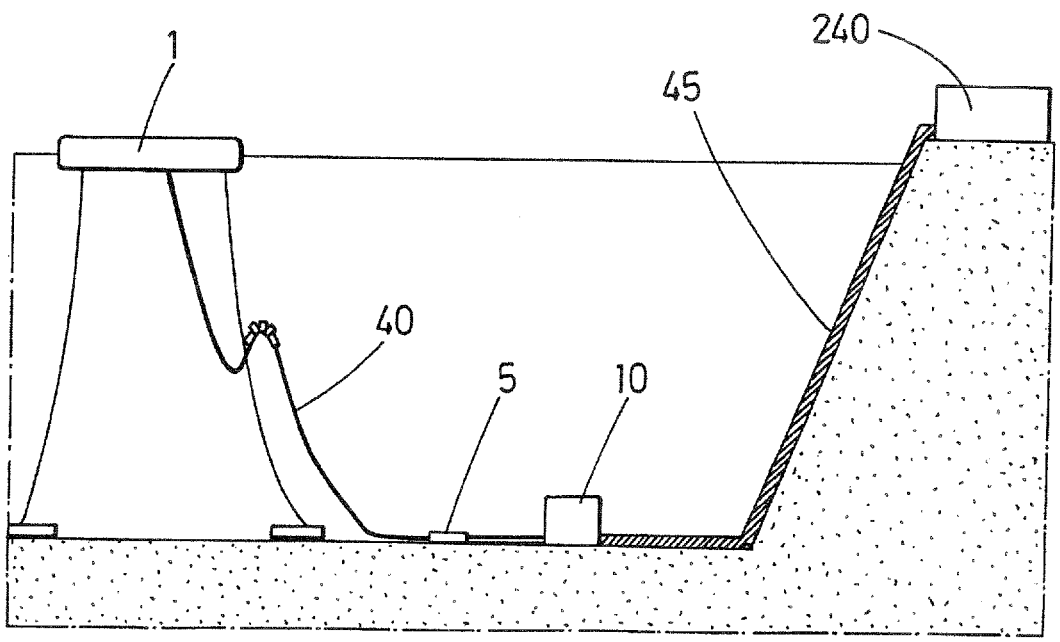
FIG. 12 shows an elevational view of a typical marine energy collecting farm configuration.

FIGS. 11 and 12 depicts a configuration corresponding to the prior state of the art and, specifically, a part of marine energy collectors where a group of marine energy collectors (1) is depicted which power and data are concentrated, by means of their umbilicals (40), in an interconnection device (10) for transmitting these to land by means of a single delivery hose or umbilical (45). That delivery hose is usually connected to the power network through a land power sub-station (240). Connectors (5) inserted in said umbilical are used for connecting and disconnecting the umbilical.

In view of this description and drawings, the person skilled in the art could understand that the invention has been described according to several preferred embodiments thereof, but multiple variations can be introduced in said preferred embodiments without departing from the object of the invention such as has been claimed.

The invention claimed is:

1. A leak-tight interconnection system for interconnecting umbilicals for transmitting power, fluids and/or data in a marine environment, between at least one power generator arranged in a marine environment and one power transfer system, the interconnection system comprising at least one transmission umbilical connectable to the power generator, one delivery umbilical connectable to the power transfer system and one leak-tight device adapted for its arrangement in a seabed, said leak-tight device comprising:
   a base adapted for resting on said bed;
   connection means for connecting said umbilicals inside the leak-tight device;
   raising elements adapted for lifting the device to the surface by means of an auxiliary boat;
   wherein the leak-tight device comprises:
   a plurality of inlets in an area of the leak-tight device other than the base, each inlet being adapted for allowing the passage of an umbilical, and the inlets being arranged so that the umbilicals are laid following one and the same direction and orientation;
   a plurality of terminal covers, each terminal cover allowing the passage of an umbilical, and each terminal cover being adapted for connecting to an inlet creating a leak-tight seal;
   a plurality of blind covers, each blind cover being adapted for connecting to an inlet creating a leak-tight seal, and each blind cover being interchangeable with a terminal cover;
   equipment for measuring, regulating or converting energy, fluids and/or data;
   and wherein the interconnection system further comprises an auxiliary anchoring element located on said seabed in the same direction and opposite orientation with respect to the leak-tight device as the laying direction and orientation of the umbilicals.

2. The leak-tight interconnection system according to claim 1, wherein the plurality of terminal covers and the plurality of blind covers comprise the same leak-tight sealing and securing means for securing to the leak-tight device.

3. The leak-tight interconnection system according to claim 1, wherein the umbilicals have a length equal to or greater than a depth of the seabed on which the leak-tight device is located.

4. The leak-tight interconnection system according to claim 1, wherein the terminal covers comprise movement restricting tubes stiffer than the umbilicals preventing the folding of said umbilicals.

5. The leak-tight interconnection system according to claim 1, wherein the leak-tight device also comprises a leak-tight sealing hatch for the operators to access the leak-tight device.

6. The leak-tight interconnection system according to claim 1, wherein the umbilicals comprise conventional electrical connection, data and/or fluid terminals designed for use in non-marine environments.

7. The leak-tight interconnection system according to claim 1, wherein the leak-tight device also comprises a surface buoy.

8. A leak-tight interconnection method for interconnecting umbilicals for transmitting power, fluids and/or data between at least one power generator arranged in a marine environment and one power transfer system which comprises:
- raising a leak-tight device with a plurality of inlets, each inlet being adapted for the passage of an umbilical from a seabed by means of an auxiliary boat;
- connecting and/or disconnecting at least one terminal cover, each terminal cover allowing the passage of an umbilical, and each terminal cover being adapted for connecting to an inlet creating a leak-tight seal;
- covering each inlet not occupied by a terminal cover with a blind cover, establishing a leak-tight sealing of said inlet;
- placing the leak-tight device on the seabed;
- a previous step of laying umbilicals according to one and the same laying direction and orientation for all the umbilicals, and all the umbilicals having a length equal to or greater than a depth of a seabed on which the leak-tight device is located; and
- a previous step of anchoring the auxiliary boat to an auxiliary anchoring device by means of an anchoring element, said auxiliary anchoring device being located on the seabed in the same direction and opposite orientation with respect to the leak-tight device as the laying direction and orientation of the umbilicals.

9. The leak-tight interconnection method according to claim 8, wherein the step of raising the leak-tight device in turn comprises not tightening the anchoring elements, the auxiliary boat therefore performing a first movement towards the laying direction of the umbilicals and the leak-tight device performing an ascending curvilinear trajectory.

10. The leak-tight interconnection method according to claim 9, wherein the step of placing the leak-tight device in turn comprises tightening the anchoring elements, the auxiliary boat therefore performing a second movement in the orientation opposite the laying orientation of the umbilicals and the leak-tight device performing a descending curvilinear trajectory.

* * * * *